Patented May 6, 1952

2,595,620

UNITED STATES PATENT OFFICE 2,595,620

HYDROGENATION OF HALOGENOSILANES

George H. Wagner, Kenmore, and Charles E. Erickson, Buffalo, N. Y., assignors, by mesne assignments, to Union Carbide and Carbon Corporation, a corporation of New York No Drawing. Application November 27, 1948, Serial No. 62,424

5 Claims. (Cl. 23—14)

The invention relates to the hydrogenation of halogenosilanes, and more particularly to a process in which hydrogen atoms are substituted for one or more silicon-bonded chlorine atoms in those chlorosilanes in which all silicon atoms are initially bonded either entirely to chlorine or to chlorine and hydrocarbon radicals.

Chlorosilanes like silicon tetrachloride, or those in which a hydrocarbon radical is substituted, such as methyl and ethyl chlorosilanes, have heretofore been hydrogenated to provide derivatives containing a silicon-bonded hydrogen. This has been accomplished, for example, by heating the chlorosilane at elevated temperatures with hydrogen, or hydrogen chloride, in the presence of the metals aluminum, magnesium and zinc. In such a process there is considerable loss of both chlorine and metal to unwanted metal salt by-products, and the vague description of the process, which has been given in the art, does not indicate that a consistent and efficient reaction to the desired hydrogenated products has heretofore been obtained.

In accordance with our invention a reaction as described is effected by passing hydrogen and a chlorosilane over silicon metal at a temperature of about 400° C. or above. The desired hydrogenation will proceed without any catalyst, although the presence of small amounts of copper or nickel will exert a catalytic effect, by increasing the reaction rate, and superatmospheric pressures will give improved conversions. Silicon in the reaction is essential for any appreciable hydrogenation, as the reaction appears to proceed in accordance with the equation

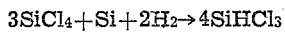

$3SiCl_4 + Si + 2H_2 \rightarrow 4SiHCl_3$

The following examples will be further illustrative of the invention.

Example 1

A mixture of hydrogen gas and silicon tetrachloride vapor, in mol proportions respectively of 2.2 to 1, was passed through a bed of powdered silicon, the silicon being about 97% pure and having a fineness of 65 to 100 mesh. The silicon bed was contained in a cylindrical glass reactor, which was heated so as to maintain a temperature of 450° C. in the reaction zone, and the flow of the gas mixture through the reactor was controlled to provide a space velocity the equivalent of about 130 seconds contact time. The product was collected by condensing the exhaust gases in a cold trap kept at a temperature of —78° C. Analysis of the liquid condensate showed a trichlorosilane ($SiHCl_3$) content of about 18% by weight, with the remainder virtually all unconverted silicon tetrachloride.

Example 2

Using the same apparatus as that of Example 1, and a reactor bed of the same powdered silicon, a gas mixture of hydrogen and silicon tetrachloride vapor, in mol proportions respectively of 3.0 to 1, was passed to the reactor. The reaction zone was maintained at a temperature of 500° C., and the gas flow was controlled to provide a reaction contact time of about 90 seconds. The liquid condensate from this run also analyzed about 18% trichlorosilane ($SiHCl_3$), with the balance silicon tetrachloride.

Example 3

A mixture of hydrogen and silicon tetrachloride, in mol proportions respectively of 1.8 to 1, was passed into a tubular steel reactor, containing as the reactor bed a 97% silicon having a fineness of 65 mesh to dust. The temperature of the reaction zone was kept at 500° C., and the space velocity of the gases was such as to provide a contact time of about 127 seconds. The liquid condensate collected as before, contained about 25% trichlorosilane.

Example 4

In this experiment the finely-divided 97% silicon was thoroughly mixed with 10% by weight of powdered copper. Hydrogen and silicon tetrachloride vapor, in mol proportions of 2.1 to 1, was passed through a bed of the silicon-copper mixture. The reaction zone temperature was held at 400° C., and the contact time was about 75 seconds. The liquid condensate from this reaction contained about 14% $SiHCl_3$.

Example 5

Raising the amount of copper catalyst in the ractor bed, 25% copper powder was mixed with the powdered silicon. Hydrogen and silicon tetrachloride was passed through this mixture, in mol proportions respectively of 2.4 to 1. The temperature of the reactor was 500° C., and the contact time was about 20 seconds. In this condensate product there was about 17% trichlorosilane.

*Example 6*

To determine the effect of nickel as a catalyst, the 97% silicon powder was mixed with 10% of powdered nickel. With this mixture as a reactor bed, hydrogen and silicon tetrachloride was introduced, in mol proportions of 2.0 to 1. The gas flow was controlled to give a contact time of about 65 seconds, and the reactor temperature was 500° C. Analysis of the liquid condensate showed about 16% by weight of trichlorosilane.

*Example 7*

A pressure reactor was made from an 8 foot, 1.25 inch extra-heavy stainless steel pipe. This tube was supported vertically and heated with 6 electric strip heaters. A 12 inch bottom part of the pipe was left open to serve as a preheat section, and a 4 foot bed of 97% silicon powder was supported adjacent to this section. A mixture of hydrogen and silicon tetrachloride, in mol proportions of 2.64 to 1, was passed to the reactor, and while maintaining a pressure of 1000 pounds per square inch and a temperature of 478° C., the gases were held in contact with the silicon bed for a period of 2.9 minutes. The product gases were cooled with tap water, and were then condensed at a temperature of −78° C. The liquid condensate contained about 38% trichlorosilane.

*Example 8*

A 1.5 inch inside diameter by 5 foot steel tube was charged with 4940 grams of an alloy of 70% copper and 30% silicon, in the form of shot. The alloy was reduced with a slow stream of hydrogen at atmospheric pressure for 16 hours at 325° C. Ethyl trichlorosilane and hydrogen, in amounts respectively of 12.7 gram mols and 24.7 gram mols per hour, were then pumped over this charge, at a total pressure of 1500 pounds per square inch, while the tube was heated from 400° C. to 525° C. Samples of the condensed liquid product were taken at 420° C., 475° C. and 520° C., and these samples showed the following analysis:

| Compound | 420° C. Sample Weight percent | 475° C. Sample Weight percent | 520° C. Sample Weight percent |
|---|---|---|---|
| $SiHCl_3$ | 2.5 | 3.6 | 4.8 |
| $SiCl_4$ | 1.7 | 1.1 | 4.6 |
| $C_2H_5SiHCl_2$ | 8.3 | 9.0 | 9.3 |
| $C_2H_5SiCl_3$ | 81.3 | 75.9 | 70.6 |
| $(C_2H_5)_2SiCl_2$ | 1.9 | 2.5 | 6.5 |
| Higher boilers | 3.3 | 4.0 | 3.5 |
| Unaccounted for | 1.0 | 4.0 | 0.8 |

*Example 9*

In the same manner as described in Example 7, methyl trichlorosilane ($CH_3SiCl_3$) and hydrogen were passed over the same copper-silicon charge. Methyl dichlorosilane ($CH_3SiHCl_2$) and trichlorosilane ($SiHCl_3$) were found in the condensate product.

As will be evident from the above examples, considerable variation in actual operating conditions are possible in this reaction. For the better yields, however, definite limitations are indicated in certain of the reaction conditions. A temperature of at least 400° C. appears essential for an economical reaction, and where no catalyst is used, the temperature should preferably be in the neighborhood of 500° C. Increasing the time of contact will improve yields, particularly at the lower temperatures, but the time factor can be correlated, and decreased, with operation at the higher temperatures. The reaction will proceed at atmospheric or higher pressures, but a considerable pressure, of say 500 pounds per square inch or higher, appears quite necessary for suitable hydrogenation of an alkyl trichlorosilane.

There is indication that the hydrogen-silicon tetrachloride ratio used has some effect on the reaction, and that higher conversions are reached with increase in hydrogen proportions. This factor must, however, be balanced against lower gas flows (or throughput) for a given contact time, so that for suitable economy the lower reactant ratios may be desirable. Practical yields of the hydrogenated product have been obtained with a wide variation in gas proportions, and with a ratio of hydrogen to silicon tetrachloride as low as 0.77. Both copper and nickel will catalyze the reaction, although without any catalyst hydrogenation will occur to an appreciable degree. The silicon used in the reaction should preferably not be too pure, and better conversion rates have been obtained with ferro-silicons of from 75% to 97% silicon.

The above and other modifications in reaction conditions are intended to be included within the broader scope of the invention.

We claim:
1. Process of hydrogenating a silane derivative of the group consisting of silicon tetrachloride and alkyl trichlorosilane, to substitute a hydrogen atom for at least one silicon-bonded chlorine atom, which comprises contacting a mixture of hydrogen and the vapor of said silane derivative with finely-divided silicon at a temperature of at least 400° C., said silicon having associated therewith a catalytic metal of the group consisting of copper and nickel.

2. Process of hydrogenating a silane derivative of the group consisting of silicon tetrachloride and alkyl trichlorosilane, to substitute a hydrogen atom for at least one silicon-bonded chlorine atom, which comprises contacting a mixture of hydrogen and the vapor of said silane derivative, in mol proportions respectively of at least 3 to 4, with finely-divided silicon, at a temperature of at least 400° C. and under superatmospheric pressure, said silicon having associated therewith at least 10% of a catalytic metal of the group consisting of copper and nickel.

3. Process of hydrogenating silicon tetrachloride to substitute a hydrogen atom for at least one silicon-bonded chlorine atom, which comprises contacting a mixture of hydrogen and silicon tetrachloride vapor with finely-divided ferro-silicon of about 75% to 97% silicon content, while maintaining the gas mixture at a temperature of at least 400° C. and under superatmospheric pressure.

4. Process of hydrogenating silicon tetrachloride to substitute a hydrogen atom for at least one silicon-bonded chlorine atom, which comprises contacting a mixture of hydrogen and silicon tetrachloride vapor, in mol proportions respectively of at least 3 to 4, with a finely-divided metal mass comprising ferro-silicon of about 75% to 97% silicon and about 10% to 25% copper, while maintaining the gas mixture at a temperature of at least 400° C.

5. Process of hydrogenating an alkyl trichlorosilane to substitute a hydrogen atom for at least one silicon-bonded chlorine atom, which comprises contacting a mixture of hydrogen and the vapor of said alkyl trichlorosilane with a copper-silicon alloy containing at least 30% silicon, while maintaining the gas mixture at a temperature of about 400° C. to 525° C. and under a pressure of at least 500 pounds per square inch.

GEORGE H. WAGNER.
CHARLES E. ERICKSON.

REFERENCES CITED

The following references are of record in the file of this patent:

UNITED STATES PATENTS

| Number | Name | Date |
|---|---|---|
| 2,406,605 | Hurd | Aug. 27, 1946 |
| 2,458,703 | Hatcher | Jan. 11, 1949 |
| 2,499,009 | Wagner | Feb. 28, 1950 |